United States Patent

Meadows, II et al.

[11] Patent Number: 5,869,822
[45] Date of Patent: Feb. 9, 1999

[54] AUTOMATED FINGERPRINT IDENTIFICATION SYSTEM

[76] Inventors: Dexter L. Meadows, II, 376 E. Alameda, Altadena, Calif. 91001; Allen J. Pouratian, 717 N. Bedford Dr., Beverly Hills, Calif. 90210

[21] Appl. No.: 727,846

[22] Filed: Oct. 4, 1996

[51] Int. Cl.[6] .................................................. G06K 05/00
[52] U.S. Cl. ............................................................ 235/380
[58] Field of Search ..................................... 235/380, 382, 235/382.5; 380/25, 49, 54, 59

[56] References Cited

U.S. PATENT DOCUMENTS 5,598,474  1/1997  Johnson .................................. 235/380

Primary Examiner—Le Thien Minh
Attorney, Agent, or Firm—Albert O. Cota

[57] ABSTRACT

An atomated fingerprint identification system (10), which utilizes an encoded identification card, such as a credit card (12). When a person applies for a credit card (12) they must register a finger of their choice with the card issuance company. At the company, the finger is scanned and a composite number (14) is produced that consists of several fingerprint identifying parameters. The composite number (14), corresponding to the fingerprint is encoded onto the card (12) and is also stored in a card database (50) and/or a server database (52). When a person wants to use the card (12), the card (12) is inserted into a card reader (22) and the person's finger is scanned by a fingerprint scanner (24) which produces a composite number (14) that is compared with the composite number (14) in the card or server database (50, 52). If the two composite numbers (14) are similar, use of the card is allowed. Conversely, if they are not similar, use of the card is disallowed.

6 Claims, 11 Drawing Sheets

| 40 | 80 | 40 | 80 |
|----|----|----|----|
| 40 | 40 | 80 | 80 |
| 60 | 60 | 60 | 60 |
| 40 | 60 | 60 | 80 |

| $X_1$ | $X_2$ | $X_3$ |
|-------|-------|-------|
| $X_8$ | ✕ | $X_4$ |
| $X_7$ | $X_6$ | $X_5$ |

AUTOMATED FINGERPRINT IDENTIFICATION SYSTEM

TECHNICAL FIELD

The invention pertains to the general field of biometric identification systems and more particularly to an automated identification system that incorporates a credit card having an encoded fingerprint of the card owner. Before the card is accepted for use in a financial transaction, the fingerprint of the card presenter is compared and verified with the encoded fingerprint.

BACKGROUND ART

Systems for identifying personnel in security-type positions or for allowing individuals to possess personal identification means have long been in use. One of the most common of these systems employs the use of fingerprints. The personal identification systems are utilized for two major kinds of control: the control of commercial transactions and the control of entry to and exit from secured areas.

In current identification systems used for the control of entry and exit, an identification number and/or a security card with a personal identification number (PIN) is assigned to a particular person in lieu of a mechanical key. When a person wants to enter the secured area, he or she swipes the card through a card reader and in some cases also inputs a security code to verify the identify of the person. If the identification number and the security card correspond with each other and with a pre-registered code, the person is granted entry or exit.

The identification systems typically employed for commercial transactions utilizes a security card, such as a credit card that is issued by a bank or other like institutions or automatic teller machines (ATM's) which require the use of a personal identification number (PIN). The PIN is used to verify the authorized use of a credit or ATM card by requiring the PIN to be inputted prior to any card transaction.

PIN's function well, however, they are often lost or the number forgotten and anyone who knows a person's PIN can access whatever transaction is desired from a particular card. Many thieves simply watch a person as they use an ATM and either memorize or remember the digits of the user's PIN. Afterwards, it is merely the task of stealing the person's wallet or purse and, the thief is able to get cash and make purchases, until a stop is placed on the stolen card. But, even if an immediate stop is placed, a thief will usually use the card before the card stop is in effect; and, it only takes a few minutes for a substantial amount of money to be withdrawn from an ATM.

There have been many identification systems proposed for verifying identity by analyzing a non-variant physical characteristic of a person, such as a fingerprint. Some of these systems utilize an examination of the image of the fingerprint by irradiating the fingerprint with light. The image formation can be filtered in terms of frequencies and compared with similar stored information.

In other systems, a light diffraction pattern is generated from a person's fingerprint and an electrical function of the detected diffraction pattern is derived. The technique for deriving the electrical function of the diffraction pattern involves a mechanical scanning of the diffraction pattern so that electrical information is derived in series; that is, the electrical function is continuously generated over a period of time corresponding to the time necessary to complete the scanning of the pattern. This electrical function can be compared with a stored electrical function to determine if a proper correlation exists, thereby verifying the identity of a person. Although fingerprint based identification systems have proven to be highly effective, they have not been able to fully utilize all of the potential parameters that can be scanned from a fingerprint. Until recently the technology has been available but simply not cost effective for the average commercial user.

The reliability and accuracy of any specific identification or verification system depends on the amount of information that can be derived for comparison with pre-registered stored information. As a result, the derived function from an image of a person's fingerprint is more reliable as more parameters are able to be stored and analyzed.

A search of the prior art did not disclose any patents that read directly on the claims of the instant invention however, the following U.S. patents were considered related:

| U.S. Pat. No. | INVENTOR | ISSUED |
| --- | --- | --- |
| 5,473,144 | Mathurin, Jr. | 5 December 1995 |
| 5,363,453 | Gagne, et al | 8 November 1994 |
| 5,180,901 | Hiramatsu | 19 January 1993 |

The U.S. Pat. No. 5,473,144 Mathurin, Jr. patent discloses a credit card that has imprinted an actual enhanced image of the card holder's fingerprint. A corresponding digitized representation of the fingerprint is also imprinted on the card. The credit card is used in combination with an apparatus that is capable of reading the fingerprint and the digitized representation of the fingerprint. Both are read optically and magnetically and once a match has been established, the user of the credit card is permitted to use the card to perform whatever transaction is desired.

The U.S. Pat. No. 5,361,453 Gagne, et al patent discloses a non-minutae automatic fingerprint identification system and process for verifying a person's identity by utilizing fingerprint patterns for the verification. A person who desires to use this system allows their fingerprint to be video scanned, and subsequently digitized. Once digitized, the fingerprint is assigned a non-minutae numerical identifier. The digitized numerical identifier comprises bytes of fingerprint identification data, which is recordable within the magnetic strip of a credit, or other similar card. A fingerprint match must be established or access to the card will be declined.

The U.S. Pat. No. 5,180,901 Hiramatsu patent discloses an IC card which includes a pressure sensor for inputting finger characteristic data, and an authenticity sensor for detecting whether a finger is authentic. Both sensors are designed to be used concurrently for their respective functions. Once the finger characteristic data is inputted, a controller calculates a sum signal from the data and collates the calculated sum with a reference sum signal of the owner of the card previously stored in a dictionary memory. After the authenticity sensor determines that the finger is authentic, the calculated and reference summed signals are compared. If the two summed signals match, the owner is permitted use of his or her card.

For background purposes and as indicative of the art to which the invention relates, reference may be made to the following remaining patents and publications found in the search:

| PATENT NO. | INVENTOR | ISSUED |
| --- | --- | --- |
| 2,952,181 | Maurer, Jr. | 13 September 1960 |
| 3,584,958 | Miller | 15 June 1971 |
| 3,944,978 | Jensen, et al | 16 March 1976 |
| 4,790,564 | Larcher, et al | 13 December 1988 |
| 4,944,021 | Hoshino, et al | 2 July 1990 |
| 4,947,442 | Tanaka, et al | 7 August 1990 |
| 5,053,608 | Senanayake | 10 October 1991 |
| 5,365,046 | Haymann | 15 November 1994 |

Publications

A. Mehtre, B. M., et al
  a. Segmentation of Fingerprint Images—a Composite Method: Pattern Recognition 1989, Volume 22 (No. 4): 381–5
  b. Segmentation of Fingerprint Images Using the Directional Image: Pattern Recognition 1987, Volume 20 (No. 4) 429–435

B. Arcelli, C. and Sanniti di Baja, G.
  Quenching points in distance labeled pictures: Seventh International Conference on Pattern Recognition, 1984 (Cat. No. 84CH2046-1)

DISCLOSURE OF THE INVENTION

The automated fingerprint identification system is primarily designed to verify that the user of an identification card such as a credit card is, in fact, the authorized user of the card. The system may also be used to: 1) search data bases of fingerprints in police departments and government agencies nationwide or world wide over the world-wide-web; 2) control access into buildings without having to issue keys, disclose passwords or assign personal identification numbers (PIN).

The versatility of the system lies in its software algorithms. Thus, it can run on desktop personal computers workstations or dedicated processors and hardware designed for this specific application. The system can be adapted for use on standard desktop scanners, digital cameras, charge-coupled devices or other devices which provide some usable digitized facsimile of the fingerprint. The output of these devices may be of different resolutions and use different scanning technologies; e.g., some scanners may use light source/sensor technology element combinations such as lamps, light emitting diodes and lasers as sources, and photo transistors, PIN diodes and charged coupled devices as sensors (detectors). In the case of digital cameras, lenses best suited or specifically designed for this application may be used. Light filters, such as a green filter, may also be used to enhance the image by reducing glare and improving or normalizing contrast thus allowing a single scanner setting to be used throughout the entire spectrum of skin tones.

In creating the card database and in applications such as credit card authorized user verification, a finger holder may be used in order to obtain a more complete and easier to process digitized fingerprint. For example, when the input device is a desktop scanner, the finger holder is used to allow the finger to be located just above the scanner table glass. This reduces glare, skin decoloration due to blood moving away from the top of the finger and distortion, all of which are responses to pressure of the fingertip against the glass.

The digitized facsimile of the fingerprint can be in the form of a bitmap, Joint Photographic experts Group (JPG) or any other usable format, provided the fingerprint line patterns are of sufficient resolution, e.g., a light intensity correlated or gray scale dot or "pixel" bitmap, where each dot or pixel corresponds to distances not further apart from each other than approximately a tenth of a millimeter on the true size fingerprint. This is a resolution of approximately 0.004 inches. Thus, consistent results can be obtained at resolutions starting at over 250 pixels or dots per inch (DPI) or better on a true size fingerprint.

In its most basic design, the automated fingerprint identification system is comprised of:
  a) means for encoding a card with digitized indicia representing the fingerprint of a card applicant;
  b) means for reading the card and supplying the digitized indicia to a card database for storage and subsequent retrieval,
  c) means for scanning a fingerprint belonging to a presenter of the card and for producing a digitized indicia representing the fingerprint of the card presenter, and
  d) means for comparing the digitized indicia retrieved from the card database with the digitized indicia from the card presenter.

The digitized indicia is comprised of a fingerprint presented in the form of a composite number and/or a personal identification number (PIN) or account number. The composite number, representing the digitized fingerprint indicia, is comprised of a number of fingerprint parameters that only pertain to the owner of the card. Also, the finger selected by an applicant, can consist of any finger from either hand thus, providing further security to the card owner.

To utilize the system, a card applicant initially requests a card issuance company to issue him or her a card having imprinted thereon the composite number. Thereafter, when the card is to be used, it is presented to a merchant, or the like, where the card is swiped through a card reader for processing. While the card is been processed, the card owner Places his or her selected finger on a fingerprint scanner where the parameters of the fingerprints are converted to a composite number. The two composite numbers, derived from the card reader and the fingerprint scanner, are compared by a comparison circuit. If the two numbers are similar, the card is validated and a transaction is allowed; conversely, if the two numbers are not similar, the card is invalidated and the transaction is disallowed.

In view of the above disclosure, it is an object of the invention to provide an automated fingerprint system that:
  allows a quick and accurate verification of a card user's identity,
  is easily installed and operated,
  will reduce the number of crimes attributed to the fraudulent use of credit and ATM cards,
  is applicable for use on various types of security system i.e, credit and ATM transactions and access to secured areas,
  is reliable and relatively maintenance free, and
  is cost effective from both a manufacturers and consumers points of view.

These and other objects and advantages of the present invention will become apparent from the subsequent detailed description of the preferred embodiment and the appended claims taken in conjunction with the accompanying drawings.

BRIEF DESCRIPTION OF THE DRAWINGS

FIGS. 16–21 illustrate the various crossing number algorithms employed by the system during the feature extraction parameter.

BEST MODE FOR CARRYING OUT THE INVENTION

Figure 1:
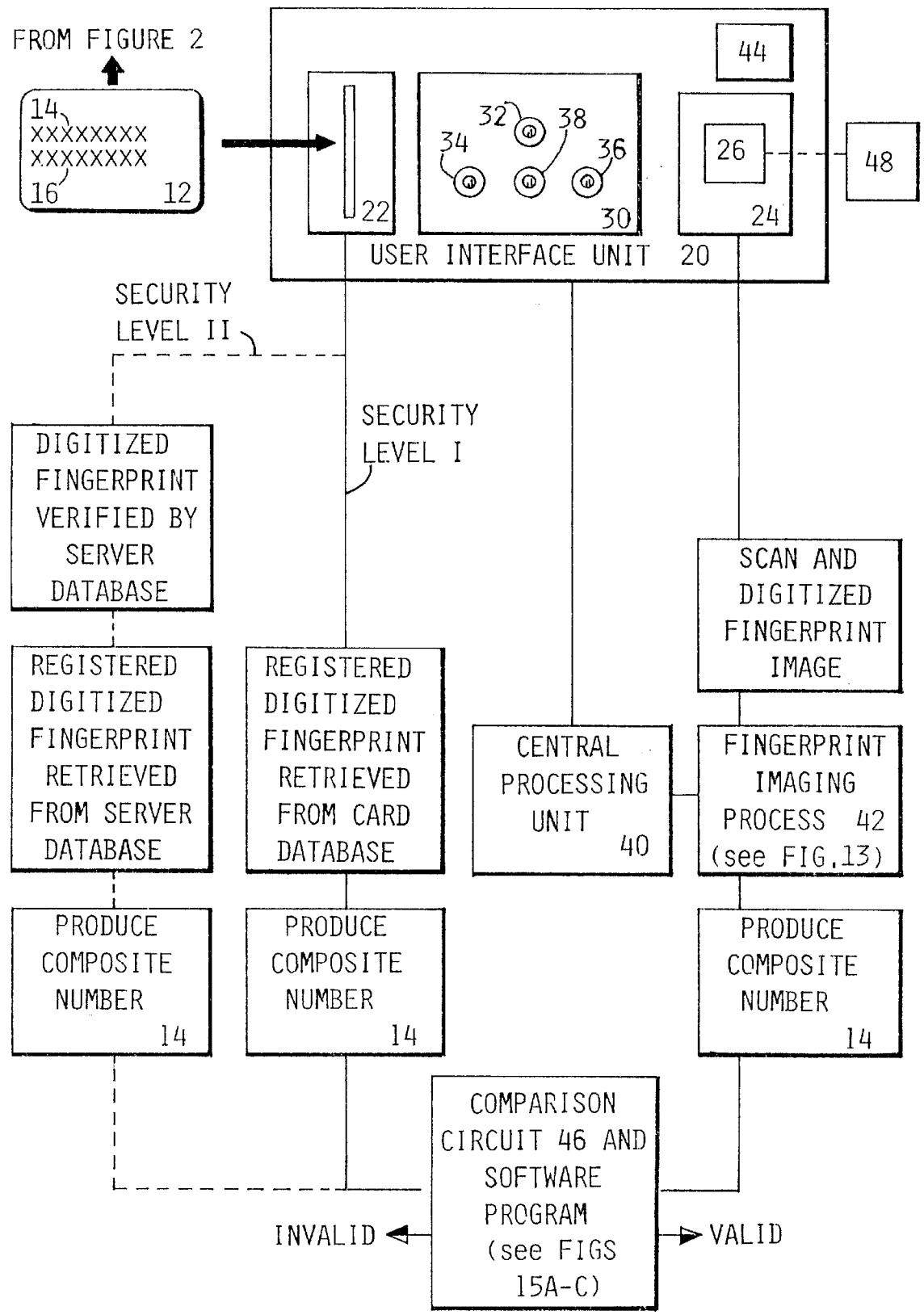
FIG. 1 is a block/flow diagram of the automated fingerprint identification system.

The best mode for carrying out the automated fingerprint identification system 10 is presented in terms of a preferred embodiment as shown in FIGS. 1–21. The system 10 is basically comprised of an encoded card, such as a credit card 12 and a user interface unit 20. The unit 20 functions in combination with a fingerprint imaging process 42 to produce a composite number 14 which is compared with a previously registered composite number 14. If the two composite numbers are similar a card transaction is allowed if the two numbers are not similar the transaction is disallowed. The system 10 is depicted in the blockflow diagram of FIG. 1.

The credit card 12 is encoded with the composite number 14, which includes several fingerprint identifying parameters that comprise the fingerprint belonging to the credit card owner. The card 1 may also include a personal identification number (PIN) or an account number 16, a picture of the card owner and other owner identification features. The encoded composite number 14 is derived from the fingerprint imaging process 42 that assigns a specific digital number to each of the identifying parameters that comprise the fingerprint. The fingerprint imaging process 42 is operated by a fingerprint imaging software program as shown in the software flow diagram of FIG. 13. The fingerprint parameters that are employed in the encoding of the fingerprint are described infra.

Figure 2:
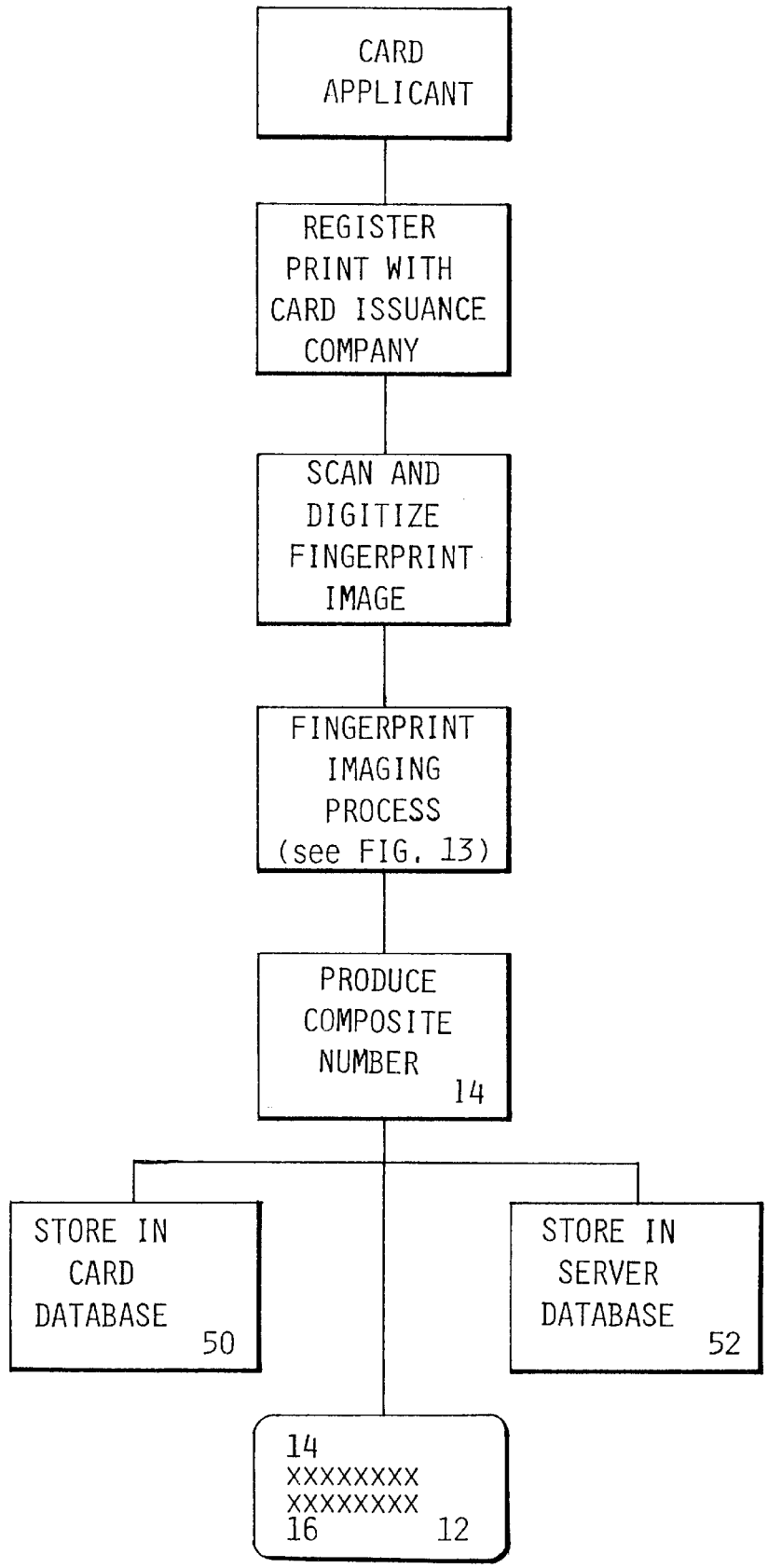
FIG. 2 is a block diagram showing the steps required to initially register a digitized fingerprint for storage in a card database or a server database.

The process for producing and using a card 12 having imprinted thereon the composite number 14 is as follows:

1. Initially as shown in FIG. 2, a card applicant submits his or her fingerprint to a card issuance company i.e., a bank for registration. At the company, the fingerprint is scanned by a fingerprint scanner 24, the scanned fingerprint image is digitized, by means of the fingerprint imaging process 42, and a composite number 14 produced,
2. The composite number is encoded on the newly issued card and the number is also stored in a card database 50 or a server database 52.
3. To use the issued encoded card 12, it is presented to a merchant or the like, where the card and applicant are subjected to a two-part verification process as shown in FIG. 1: In the first part, the issued card 12, is processed by the card reader 22 and subsequently applied to the card database 50 or server data base 52 where the Composite number 14 is either verified or not verified. If the number is verified, it is applied to the comparison circuit 46 as shown in FIG. 1. In the second part of the verification process, the card owner submits his or her fingerprint to the merchant where the fingerprint is scanned by the fingerprint scanner 24, the scanned fingerprint image is digitized and a composite number 14 is produced,
4. The composite number 14, derived from the merchants fingerprint scanner 24, is applied to the comparison circuit 46. If the number 14 from the scanner 24 is similar to the number 14 derived from the card reader 22 and card database 50 or server data base 52, the card 12 is validated and the transaction allowed conversely, if the two composite number are not similar, the card is invalidated and the transaction is disallowed.

Figure 14:
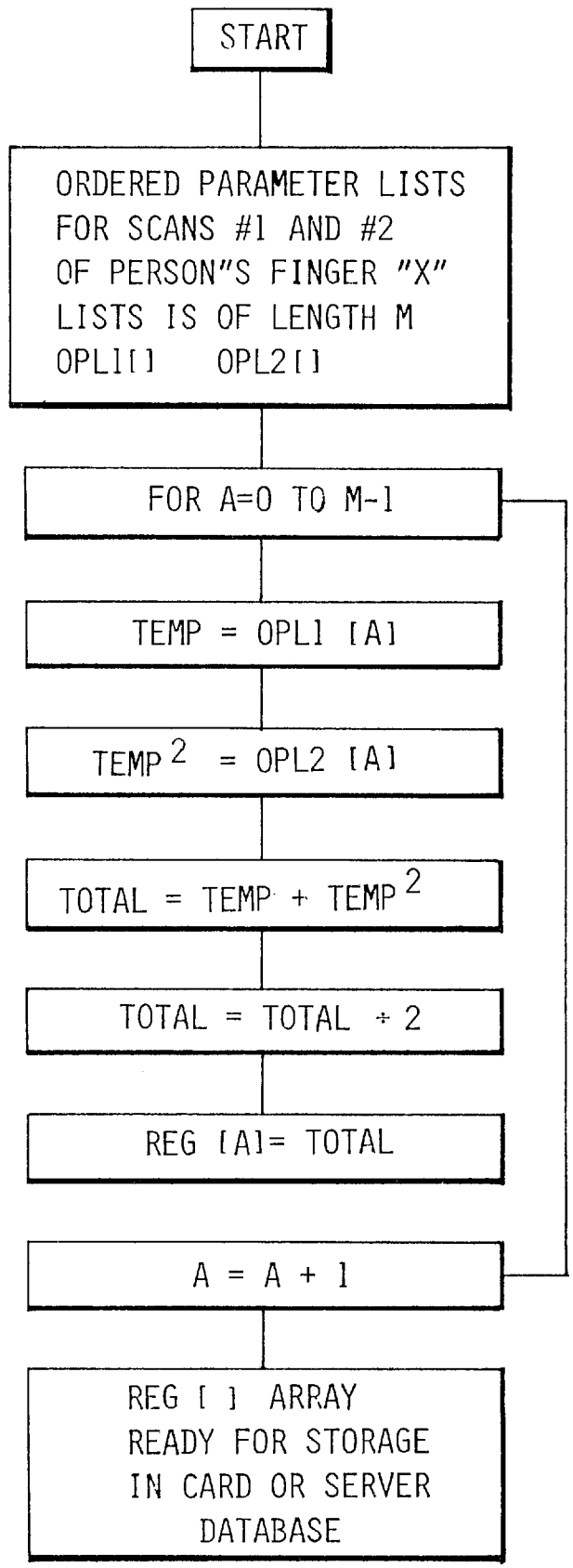
FIG. 14 is the software flow diagram for the fingerprint registration.

To increase the reliability of the automatic fingerprint identification system 10, the data for each composite number undergoes registration prior to database storage. For one finger, at least two separate scans are processed, and each scan yields a somewhat different composite number. All composite numbers extracted from the same finger from different scans are averaged with each other on a parameter by parameter basis, and an "average" composite number results. The resulting composite number is then stored into the card database 50 or server database 52 as the registered composite number. The logic of the etymology is that the separate scans of the same finger yield somewhat different composite numbers which must "register" their differences with each other through averaging. A fingerprint registration software program to operate the fingerprint registration is shown in FIG. 14.

The fingerprint may be selected from any finger of either hand and is preferably physically scanned and encoded at the card issuance company. However, in some cases, the fingerprint may consist of a verified copy of the fingerprint as can be obtained from a government agency such as the Department of Motor Vehicles (DMV). In either case, the fingerprint is processed, encoded and ultimately imprinted on the credit card 12 as the composite number 14 that represents the fingerprint of the specific credit card applicant. The credit card 12 may also be encoded with a plurality of composite numbers 14 which correspond to a plurality of fingerprints. For example, a couple, such as a husband and wife, may elect to have both their composite numbers 14 on a single credit card 12 to allow either party to use the same card 12.

The user interface unit 20, as shown in a block form in FIG. 1, is typically comprised of the following major elements: a credit card reader 22 a fingerprint scanner 24 that preferably operates in combination with a finger holder 26, a display panel 30, a central processing unit 40 that operates with a fingerprint imaging process 42 which can be in the form of firmware when the system 10 is self-contained or software, a comparison circuit 46 and a power supply 44. The credit card reader 22, fingerprint scanner 24, and the central processing unit 40, are readily available and conventionally connected. Therefore, these units are not described in detail.

The display panel 30, as shown in FIG. 1, incorporates a start button 32 that when pressed, allows the system 10 to commence operation, as shown in FIGS. 1 and 2, a PASS LED 34, a FAIL LED 36 that when lit indicates that the credit card is valid or invalid respectfully and a TRY AGAIN LED 38 that when lit indicates that the system 10 has obtained marginal results and therefore the card presenter is requested to try again.

Figure 15A:
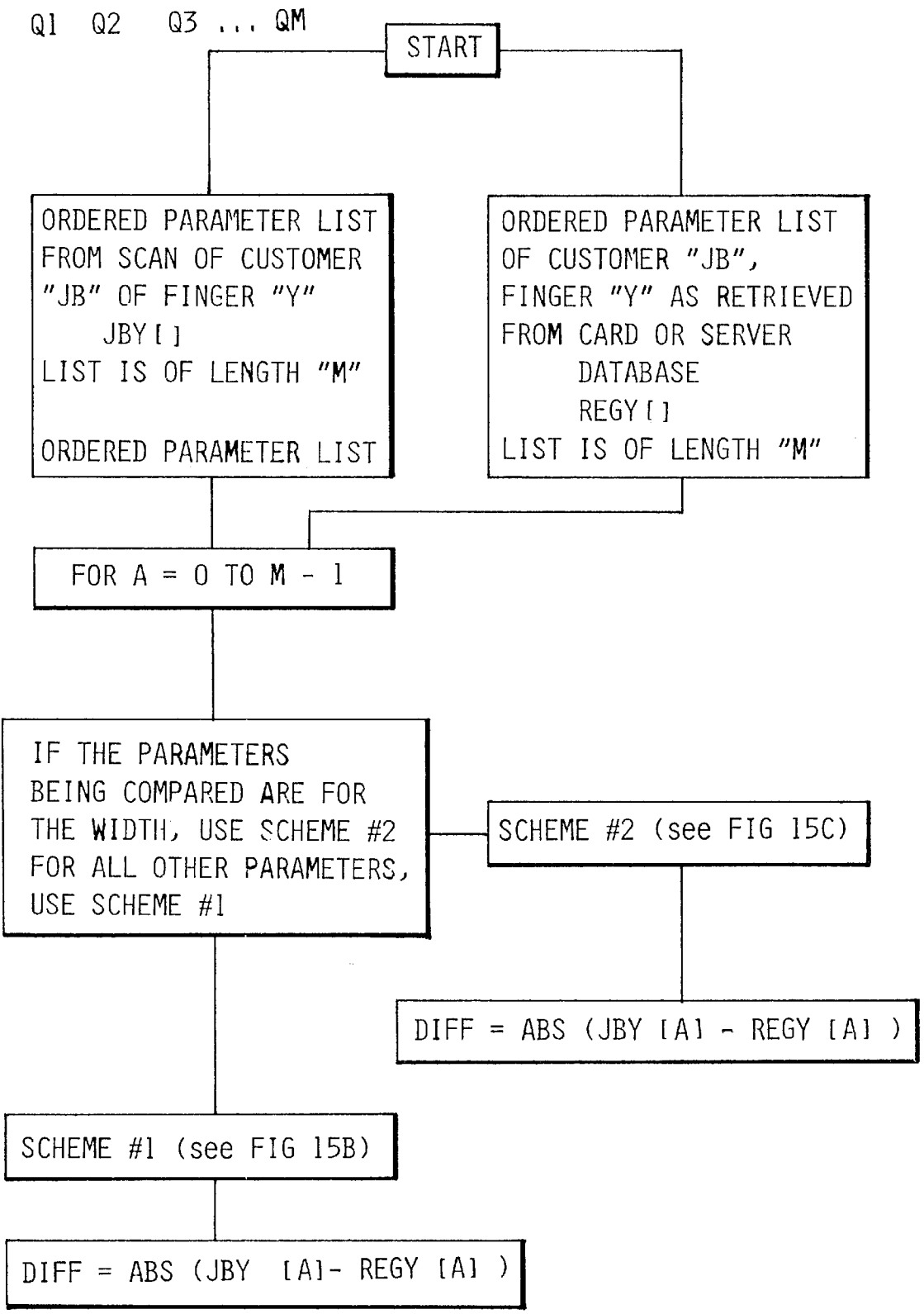
FIGS. 15A–C is the software flow diagram for the comparison circuit.
Figures 15B, 15C:
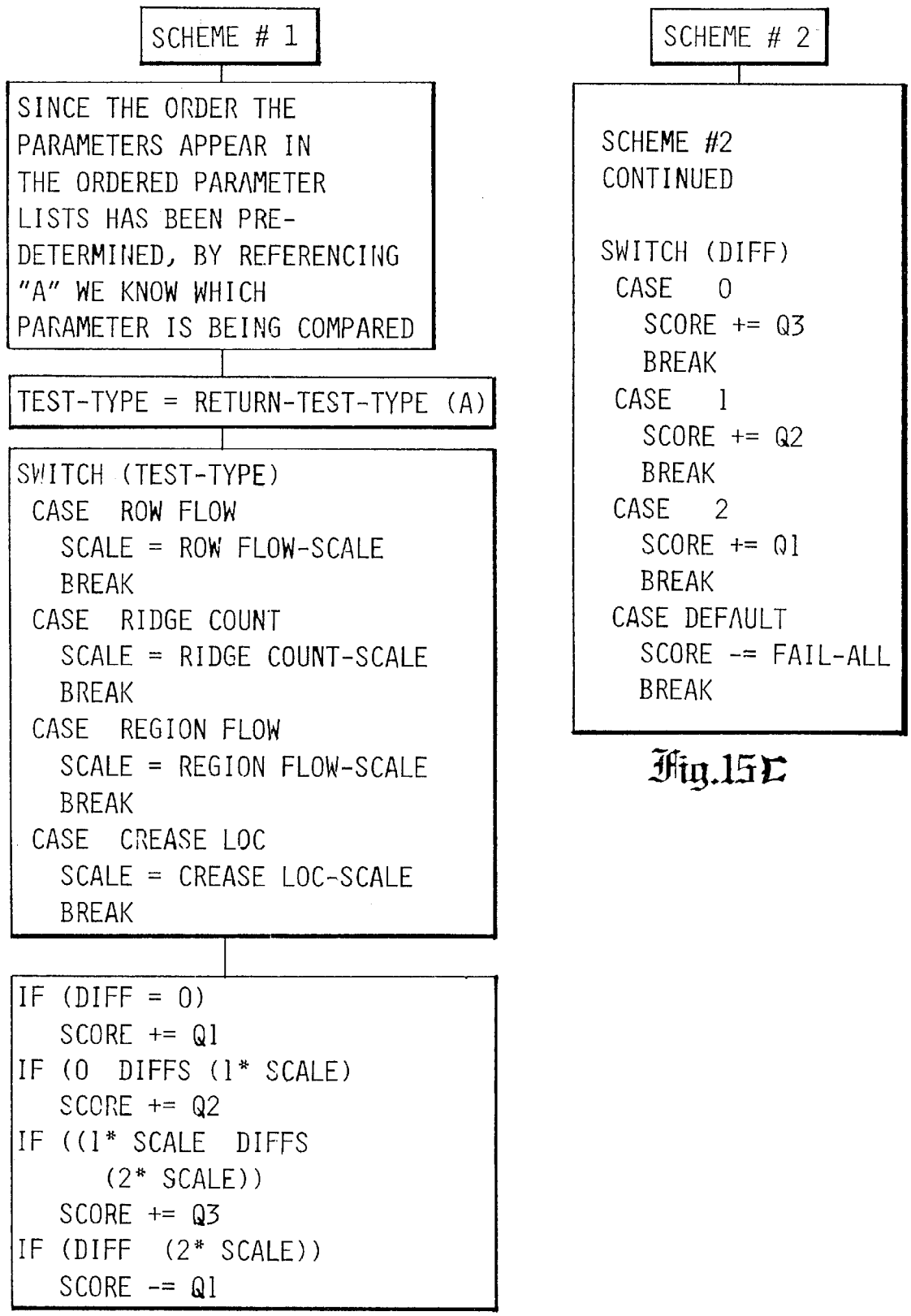

The comparison circuit 46, which is an element of the user interface unit 20, compares the composite number 14 of the scanned fingerprint with the composite number 14 encoded in the credit card 12 and applied to the circuit 46 via the card database 50 or server data base 52 as shown in FIG. 1. The comparison circuit 46, is operated by a comparison circuit software program as shown in FIG. 15A that can be operated by either a scheme 1 as shown in FIG. 15B, or scheme 2 as shown in FIG. 15C. The comparison circuit includes circuit means for comparing the fingerprint parameters from both the person trying to gain access, and from the card database or server database, to each other. The comparison circuit awards points to the person passing for himself or herself depending on how similar or dissimilar the fingerprint parameters are. If the points totaled after comparing all the fingerprint parameters exceeds a pre-determined threshold, the card 12 is validated and a transaction is allowed. Higher thresholds allow for stricter security, but cause more problems with people not passing for themselves.

For some fingerprint parameters, greater similarity will award points, and less similarity will award less points. To great a dissimilarity, after at least two tries, causes the card 12 to be invalidated and its use prohibited. For other parameters, great similarity will subtract points, good similarity will add points, and moderate similarity will add even more points. But for even these parameters, too great a dissimilarity will also result in an automatic failure.

In FIG. 1 also shows two levels of security access: a security level I and a remotely located security level II shown by broken lines. In security level I which is considered the normal and most often used security level, after the credit card is swiped, the registered digitized fingerprint is retrieved from the card database 50 wherein a composite number 14 is produced that is applied to the comparison circuit 46. In security level II, the registered digitized fingerprint is verified and retrieved by the server data base 52 and a composite number 14 is produced that is applied to the comparison circuit 46. Security level II is more secure because the remote server database 52 controls access to the composite number 14 of a particular fingerprint. Also security level II is designed to preclude an exceptional thief from altering the digitally encoded fingerprint to match his or her own fingerprint.

Security level I can be used alone for maximum transaction speed, or security level II can be used alone for maximum transaction security. Also, security level I can be used in combination with security level II to assure that the fingerprint information on the card itself has not been tampered with. Thus, providing another hurdle for the exceptional thief which would alter the contents of the card.

Figure 3:
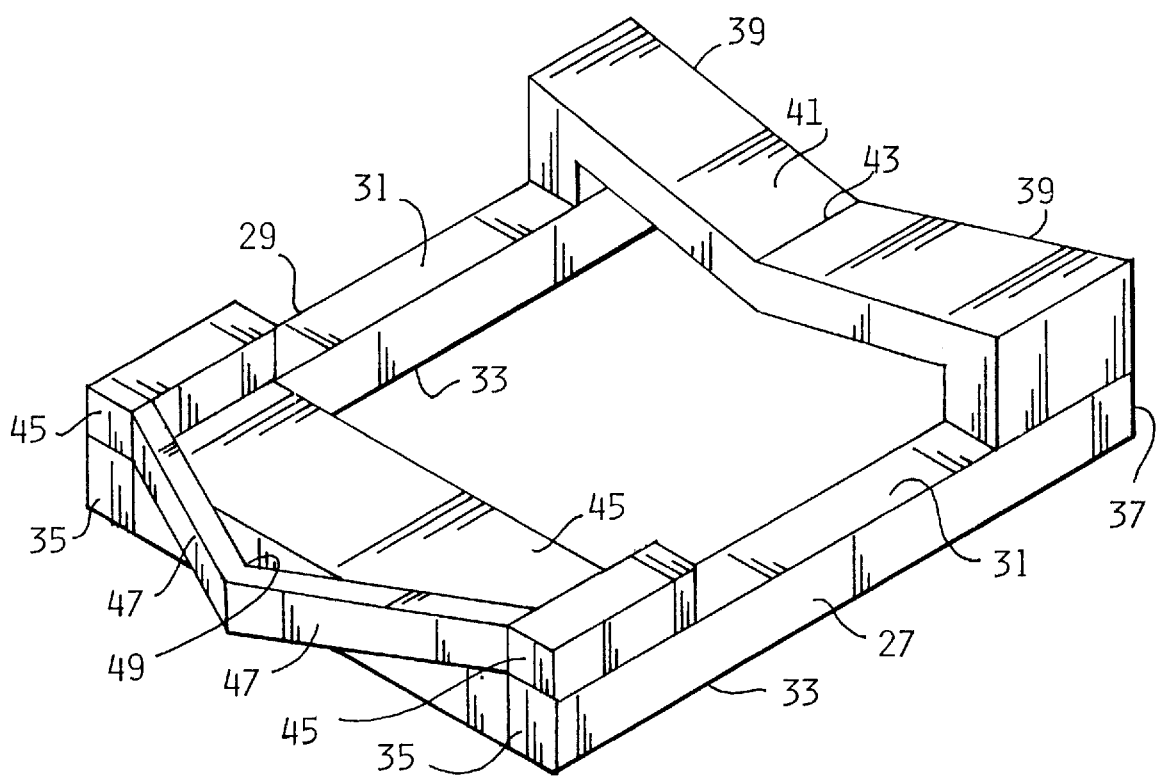
FIG. 3 is a perspective view of a typical finger holder that optimally positions and steadily holds a finger that is being scanned by a finger scanner.

To assure a high-resolution fingerprint, a finger holder is preferably used to steadily hold and position the finger on the fingerprint scanner 24 as shown in FIG. 1. A typical finger holder 26 that can be used for this purpose is shown in FIG. 3. The finger holder 26 includes a first side member 27 and a second side member 29. each of these side members further include an upper surface 31, a lower surface 33, a front edge 35 and a rear edge 37.

At the rear edges 37 and the upper surfaces 31 of the first and second side members 27,29 is located a rear finger support 39. The support 39 has a downward extending angular surface 41 having a substantially centered vertical apex 43 that maintains the finger in alignment relative to the x-axis of the fingerprint scanner 24.

At the front edges 35 and on the upper surfaces 31 of the first and second side members 27,29 is located a front finger support 45. The support 45 has a forward extending angular surface 47 having a substantially centered horizontal apex 49. The apex 49, which is in alignment with the vertical apex 43 of the rear finger support 39, stops the tip of the finger at a consistent position relative to the y-axis of the fingerprint scanner 24. The front finger support 45 is positioned slightly lower or higher than the rear finger support 39. This positioning deviation produces a high-resolution fingerprint by allowing a shadow to be cast from the ridges into grooves of the fingerprint when the light from the scanner 24 passes over the finger. The design of the finger holder 26, as shown FIG. 3, prevents the finger from touching the surface of the fingerprint scanner 24.

To enhance the scanning of a fingerprint, a green filter 48 may be juxtaposed adjacent the lower surface 33 of the finger holder 26 or adjacent the fingerprint scanner 24. The filter 48, as shown in FIG. 1, compensates for the various finger skin pigmentations.

The fingerprint that is scanned and digitized at a merchant, and the fingerprint that is included in the presented card 12 includes a plurality of fingerprint parameters. To facilitate the accurate accumulation of these various fingerprint parameters, several parameters and parameter extraction methods are utilized as described below:

Fingerprint Line Orientation Detection

Figure 4:
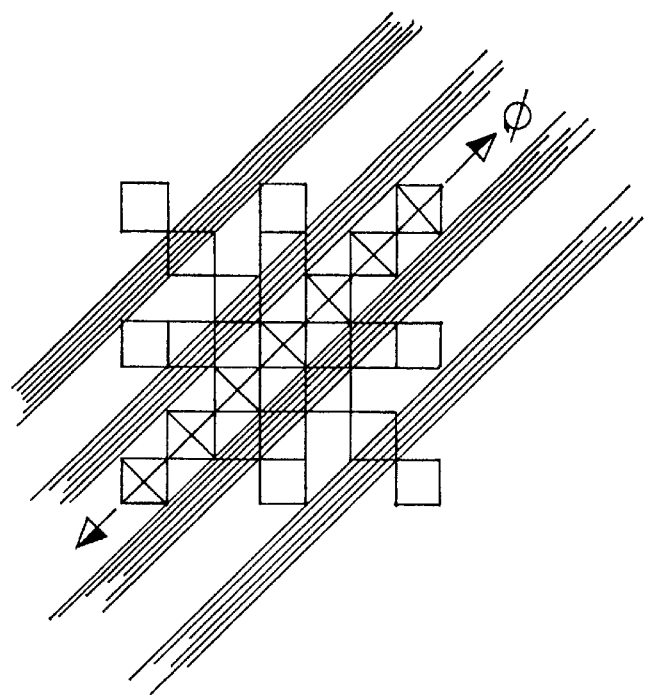
FIG. 4 is a depiction of fingerprint line orientation detection.

At each discrete dot or "pixel" in the digitized image, the orientation of the fingerprint line passing through it is determined. This is accomplished as shown in FIG. 4 by approximating the orientation of the line to an angle $\phi$ at each pixel using equal increments of degrees up to 180 degrees minus one increment of degrees. Thus, if an increment of 22.5 degrees is used, $\phi$ would have any of the following eight angular orientations: 0.0, 22.5, 45.0, 67.5, 90.0, 112.5, 135.0 and 157.5 degrees. The final $\phi$ orientation assigned to each pixel is that which most accurately matches the actual orientation of the fingerprint line at that point. Note that the quantity of angular orientations can range from four to any maximum number. However, for descriptive purposes, eight angular orientations are used throughout the specification.

Using the pixel at which the orientation is being checked as the pivot point or "center", and the pixel brightness value $p_o$ of the center pixel at a bitmap location $(i_o, j_o)$ and "neighbor" pixels brightness values $p_d$ at bitmap locations $(i_k, j_k)$ along the orientation $\phi$ being checked the sum $s_d$ of the absolute values of the differences between brightness values of the center pixel and the neighbor pixels is computed. A "neighbor" pixel for the purposes of describing the present invention, is one along the line of orientation being checked that is used in the computation. An equal number of neighbor pixels is used at each side of the center pixel along the orientation line being checked. The expression for the computation for each orientation $\phi$ is as follows:

$$Sd = \sum_{k=1,n} |p_o(i_o, j_o) - p_d(i_k, j_k)| \text{ for } d = 1, \ldots, N$$

The number and spacing of neighbor pixels required at each side of the center along the direction being checked may vary. In determining these, there are two primary factors as well as a single secondary factor to be considered.

The first two factors assure that enough distance on the actual fingerprint is spanned by the neighbor pixels so that when the direction checked is n0 degrees orthogonal to the direction of the fingerprint line, 1) the distance between the furthest neighbor pixels (one furthest in each direction from the center) is approximately the same distance as the largest distances typically found between adjacent ridges in fingerprints and 2) the distance between any two consecutive pixels used along the direction being checked, is not more than the smallest distances typically found between a ridge and a valley in fingerprints. The last determining factor for the number of neighbor Pixels used is the execution time. Good results have been obtained using eight pixels, four at each side of the center, in line with the direction being checked.

For lower resolution digitized images the consecutive neighbor pixels may be contiguous on the bitmap. For higher resolution digitized images, some of the pixels may be skipped in-between "neighbor" pixels.

The lowest sum $s_d$, of all directions checked is the one that more closely approximates the actual orientation of the line at that location. Thus, the orientation $\phi$ assigned to the pixel is the one that gives the lowest value for $s_d$. The sum $s_d$ with the highest value is closes to 90 degrees orthogonal to the orientation of the fingerprint line at the point checked.

Block Orientation

Figure 5:
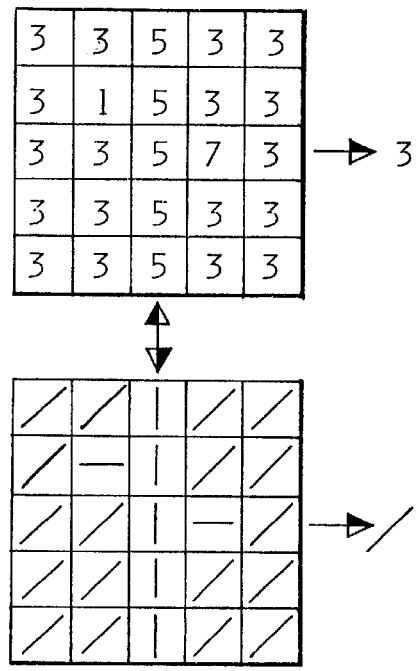
FIG. 5 is a depiction of block orientation.

The results of pixel orientation detection are stored so that calculation of block orientation majority is Convenient for computational purposes. In this manner as shown in FIG. 5, orientation in blocks or regions may be determined. The blocks may be 5×5, as shown in FIG. 5, 15×15 or any other block size that is desired according with the resolution of the bitmap and application, e.g., if the majority of the 225 pixels in a 5×5 block have an orientation angle $\phi$ of 45 degrees i.e., the greatest number of pixels in the block have that orientation, then the block is assigned the block orientation of 45 degrees.

Row Flow

Figure 6:
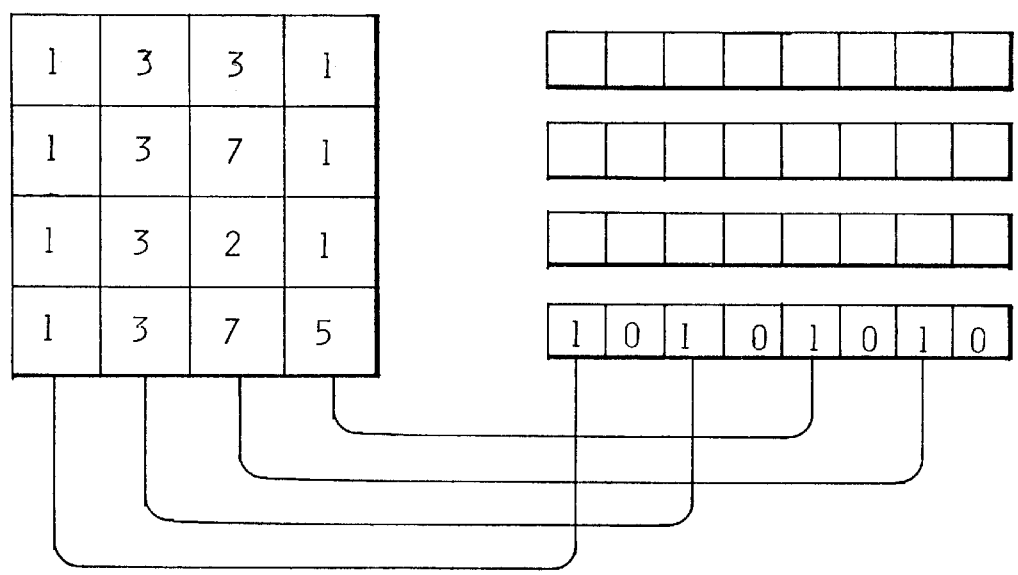
FIG. 6 is a depiction of row flow.

The flow of the fingerprint which is considered the primary fingerprint identification parameter is determined by rows. The rows, as shown in FIG. 6, may be one pixel high or may be a row of n×n pixel blocks or other groupings (where 3<=n<=15). For each row, however composed, a count is kept for each pixel or block orientation for each of the orientations checked under the routines described supra or multiple thereof, resulting in "M major row orientations". For the purpose of the present invention, sixteen orientations are used, although eight can also be used. The number of row flows can range from 1 to infinity depending on dpi and available storage. The rows may be composed of single pixels or blocks thereof. If blocks are used, then the counts for the block orientations, one for each of the M major row directions. This may be executed throughout the entire scan, in such instances when predictable scans are available by avoiding only the anomalies of the edges, or it may be applied to regions as determined in the description of the previous section, depending on the application.

Side Detection

Figures 7, 8, 9:
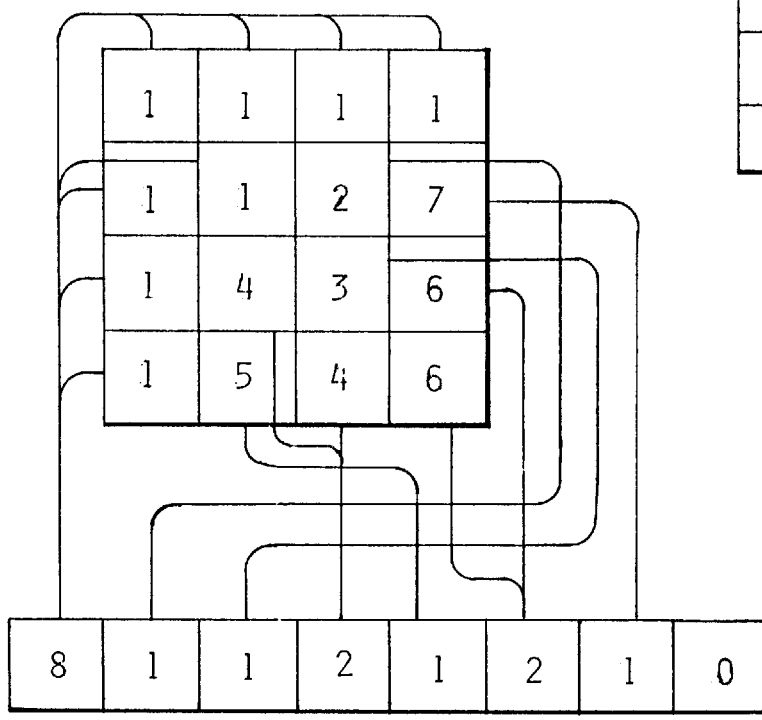
FIG. 7 is a depiction of side detection.
FIG. 8 is a depiction of region flow.
FIG. 9 is a depiction of ridge counting.

The sides of a fingerprint are located using block orientation, as described supra and as shown in FIG. 7. For lower resolution digitized images a 5×5 block can be utilized. The columns of block directions are checked until the two columns with the largest number of 90 degree block directions are located—one column at each side. The columns of blocks may be adjacent to each other or overlapped, depending on the resolution of the digitized image. For lower resolutions overlapping may be used and for higher resolutions adjacent columns or larger blocks may be utilized to reduce the execution time. For the purposes of this invention, width is the parameter extracted.

Region Flow

Flow by regions is utilized as another means of comparing fingerprints as shown in FIG. 8. when searching police databases, this method of comparing is preferred. Often the prints available from these databases are only partial, and may be smudged or distorted, thus permitting only a single "region" to be usable for search and comparison. In regards to systems for credit card authorized user verification, a single central predictable region may be utilized. For example, a region centrally located of about 1 cm$^2$, which starts 7 mm down from the tip of the finger may be used. In each region, a count is kept for each block orientation resulting in "N major regional block orientations". For the Purposes of describing the present invention, N=8 and the blocks are 4×4 as shown in FIG. 8.

In a situation where only a partial fingerprint is available, such as in crime scene investigations, the other parameter extracting routines described for this invention may be applied to the available segment or region of the print. The fingerprint is modified accordingly for block size and definition, and the system is directed to look at equivalent regions of prints in the database.

Ridge Counting

Figures 10, 11, 12:
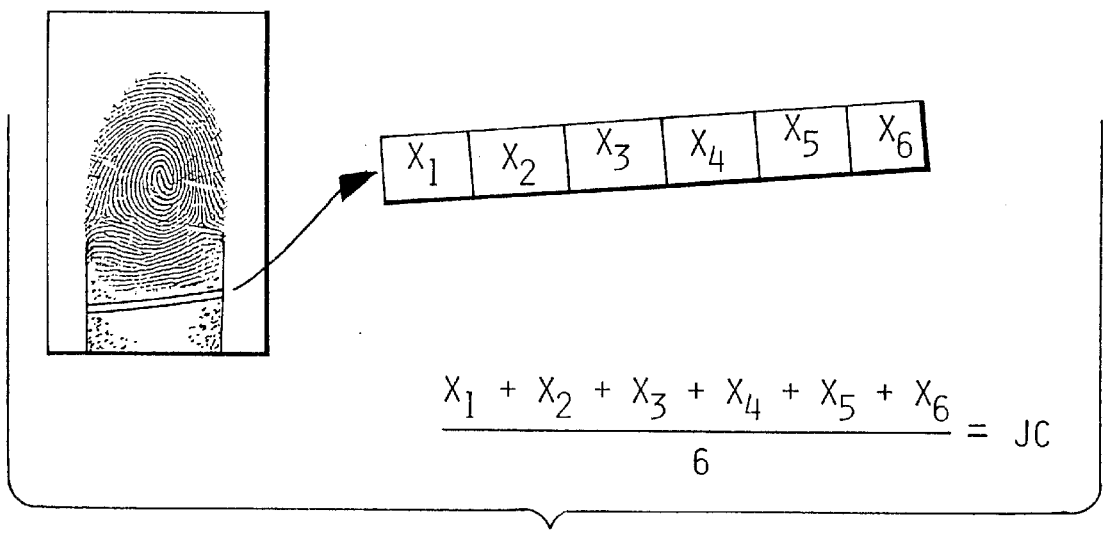
FIG. 10 is a depiction of finger joint crease detection.
FIG. 11 is a depiction of average brightness.
FIG. 12 is a depiction of feature extraction.
Figure 13:
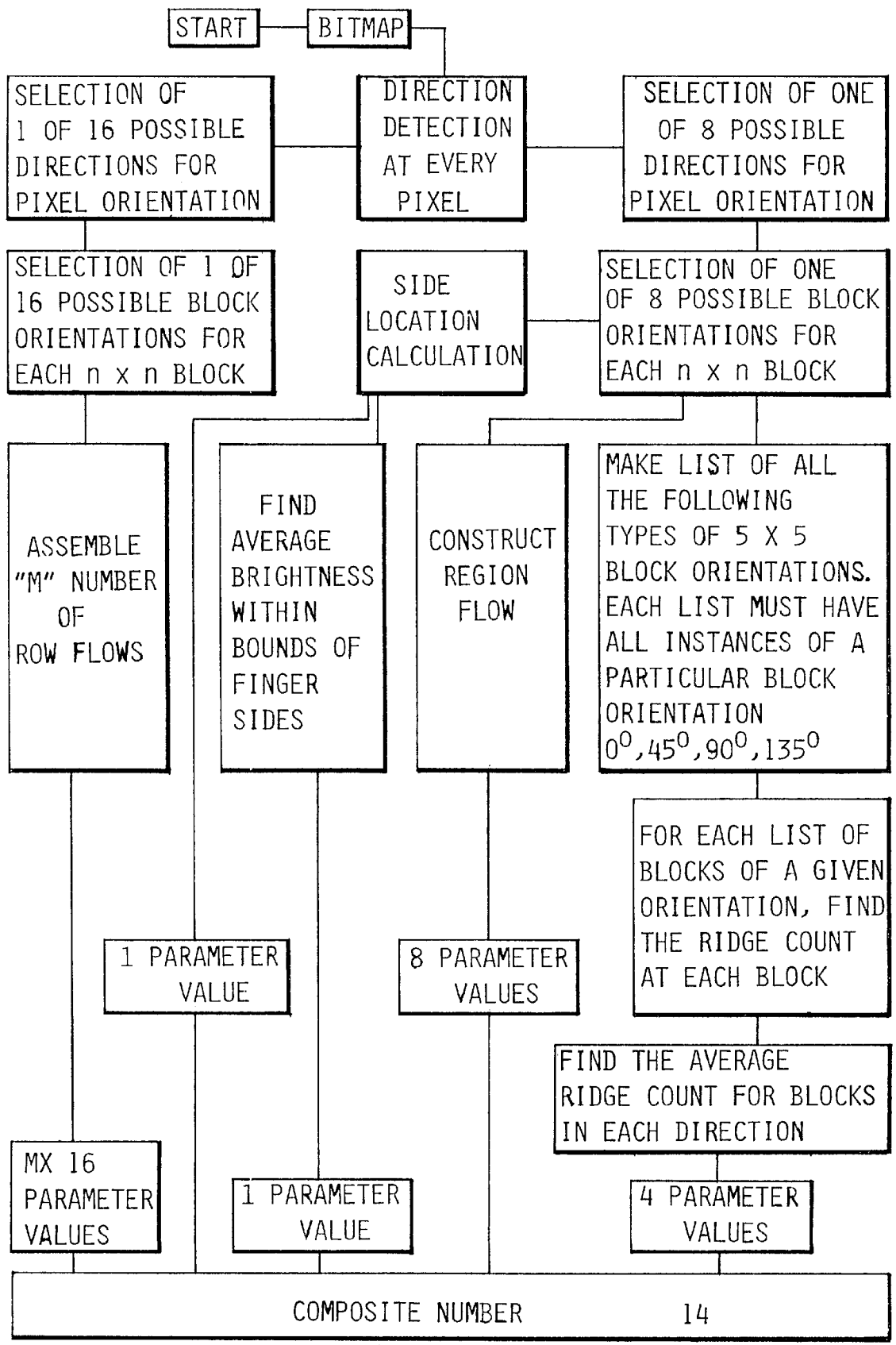
FIG. 13 is the software flow diagram for the fingerprint imaging process.

Prior to commencing the optional finger joint crease detection, as described in the following paragraph and as shown in FIG. 10, an average ridge count is performed. An average block count of ridges changes from dark to bright values—for each of a minimum number of "main orientations". For the purposes of describing this invention as shown in FIG. 9, four main orientations are used: 0, 45, 90 and 135 degrees respectively. For each main orientation, blocks with matching block orientation in the fingerprint are utilized. For each main orientation blocks with matching block orientation in the fingerprint are utilized for the purpose of description, blocks of n×n are used (where 3<=n<=15). A change from light to dark, or vice-versa is noted and added to the running total for the current 5×5 of a given orientation, when the current pixel's brightness differs from the previous pixels by more than a color depth dependent constant. The sum is then divided by the total number of blocks used that matched the main orientation being extracted. Pixels are always checked in the direction perpendicular to the given block orientation. when the block orientation is 90° (up/down flowing), the ridge counting proceeds from left to right.

Finger Joint Crease Detection

The joint closest to the tip of the finger on the fingerprint side includes a crease whose distance from the tip of the finger can be digitized and used as one of the comparison parameter as shown in FIG. 10. The crease is wider and smoother than the valleys and ridges found on other areas of a fingerprint. Thus, a check for a valley width greater than the remainder of the print and a consistently darker area is made.

An algorithm is utilized to check large blocks, e.g., 15×15 with zero degree orientation and brightness values at the lowest or close to the lowest brightness values for the particular fingerprint. A ridge count (change from dark to bright values) is made in the 90 degree direction and will typically be markedly lower across the crease region.

Average Brightness

The average brightness (AB) of a fingerprint, as shown in FIG. 11, can also be used as an additional parameter as long as the light sources and sensors in the digitization process provide close results. Where intensity of sources or sensitivity of sensors changes due to aging, temperature, humidity or otherwise, a correction factor may be introduced to facilitate this parameter's use.

The basic average brightness is the sum of the brightness value of each pixel divided by the total number of pixels included in the sample, which could be a region or the entire fingerprint, excluding edges. The simplest correction factor is accomplished by taking the average of the darkest and brightest pixels in the sample and subtracting it from the basic average. Other correction factors may be devised empirically or as required.

Feature Extraction

Feature extraction, as shown in FIG. 12, is an optional parameter which is performed after the scanned bitmap image of the fingerprint has been processed using well known and documented procedures. First the scanned bitmap is edge detected, then the resulting image is thresholded into a black and white image, next the resulting image from the previous step is subjected to a process called "thinning" to thin the thickness of the ridges or fingerprint lines. The crossing Number algorithm, and the subsequent "Feature Validator" function require a thinned image to work their best.

Once the processing chain has produced a thinned image, minutae or branch points are extracted by means of a Crossing Number algorithm which yields branch points. very branch point is checked and the validity of each point is determined as shown in FIGS. 16–21.

To illustrate how this "Feature Validator" functions, a branch point is marked off by the "crossing Number" algorithm as shown in FIG. 16 and as described in references A and B listed under "Publications" in the Background Art section.

The "P" characters are all pixels in the bitmap. The "X" character is the pixel at which the Crossing Number algorithm has declared that a branch point exists. The numbers immediately surrounding the "X" symbol designate empty pixels. If all the numbers designating pixels surrounding the "X" pixel were visible, the FIG. 16 diagram would look like the following FIG. 17 diagram.

A loop is provided where all eight pixels surrounding the "X" pixel are tested. If the pixel is not colored in the "Branch Test" (BT) function is not called. kihen the pixel is colored-in, as in the case of the "P" symbols in FIG. 16 and the 3, 4 and 8 symbols of FIG. 17, the BT function is called. Each time the BT function is called from this loop, a parameter called "NumToGo" is assigned some constant value. NumToGo will be passed to the function BT, and whenever BT calls itself, it decrements NumToao by one. For example, if NumToGo is initially set to 5, the BT function would be called on pixels 3, 4 and 8 and not on 1, 2 5, 6 and 7, and each successive invocation of BT decreases NumToGo to 4, 3, 2, 1 and 0.

FIG. 18 represents the BT function's view after it has been called on pixel 3 from FIG. 17 which corresponds to the pixel P two spaces above and to the right of pixel "X" in FIG. 16. In this case, the BT function is marked with an "X". Since BT has been called from a function that is not itself, the NumToGo value passed will be the initial default 5 (though this number can be increased and decreased to make the function stricter or more liberal).

Once the BT function has centered itself on the new pixel now called "X", it checks only the 1, 2, 3, 5, and 8 positions because the BT function does not look in the direction it was called from. In FIG. 18, the position "3" is obscured and a "P" holds its place. In other words, when the BT function is called upon pixel 3, the BT function looks at the pixels surrounding pixel 3, which are not adjacent to any pixels adjacent to pixel "X" as shown in FIG. 17.

The BT function checks and sees that the "P" which occupies position "3" relative to "X" is colored in, and then calls itself recursively in direction "3" on the pixel marked "P" to the top and right of pixel "X" as shown in FIG. 18. The value of NumtoGo is decremented from 5 to 4, and the resulting 4 is passed to the BT being called.

A 9-place data structure called "Y-point Array" is also passed each time BT calls itself recursively. Initially, when the BT function is called from the main loop, the Y-point Arrays' values are set to zero. Before BT calls itself recursively, the unit in the y-point Array corresponding to the direction being moved in is incremented. In this case, since the BT function is moving in the "3" direction, the 3rd element of the Y-point array is incremented producing a Y-point array: 0 0 1 0 0 0 0 0 0. The BT function when viewed from a new "X" produces the diagram shown in FIG. 19.

The BT function will look ahead to the positions 2, 3, 5, 7 and 8 relative to its new "X". At position 5 it will see a "P". The BT function will call itself in direction 5. NumToGo is decremented from 4 to 3 to produce a Y-point array: 0 01 0 1 0 0 0.

Once again, when the function calls itself from the state depicted in FIG. 15, the state will change to the state indicated in FIG. 16, the BT function looks ahead to the positions 2, 3, 5, 7 and 8 relative to its new 3 "X". At position 5 it will see a "P". The BT function, will call itself in direction 5, NumToGo is decremented from 4 to 3 to produce a Y-point array: 0 0 1 0 2 0 0 0. When the BT function is called again the diagram of FIG. 21 is produced.

Once again, the BT function will look ahead to the positions 2, 3, 5, 7 and 8 relative to its new "X". At position 5 it will not see a "P" and the BT function will not decrement NumToGo and call itself again. BT will return the value of NumToGo to indicate how far along the branch point extended before failing.

If the BT function had called itself to follow pixels on the branch to the point where NumToGo was decremented to 0, then the function would return to the value 0.

If the function BT reaches a point where it can branch off in two directions, it will mark a special case flag, and will call BT on both of the branches. While following either of the two branches, BT must never come across another branch for at least NumToGo pixels. If at any time, BT is placed across three or more branch points, the value of α−1 is returned to indicate noise.

When the main loop has recorded the result of the three branches, at least two of the branches equal NumToGo's original value. If any of the three invocations returns a α−1, the branch is declared invalid.

At each feature found, the number of times the algorithm is called—meaning how many branches are found at each feature location—can be used as an additional comparison parameter. Also, the total number of features found may be used as a parameter. This all can be done on a per feature, per region or per entire extensive searches of data bases in criminal investigations, rather than in the less demanding applications such as in the verification of authorized building access or credit card use. In these last applications, the time consuming process of thinning and feature extraction could easily become an inconvenience.

Parameter Comparison

Once all of the parameters have been extracted they are compared with equivalent parameters in the card database 50 or server database 52 or added to the database if an initial collection of data is being made. The number of parameters available in a database for comparison varies depending on application and circumstances.

To validate a credit card user and for the purpose of describing the present invention, at least one of the following comparison parameters are used:

| DESCRIPTION | NO OF PARAMETERS |
|---|---|
| Side Detection | 1 |
| Row Flow | 16 |
| Average Ridge Count | 4 |
| Finger Joint Crease Selection | 1 |
| Block Orientation | 8 |
| Average Brightness | 1 |

While the invention has been described in complete detail and pictorially shown in the accompanying drawings it is not to be limited to such details, since many changes and modifications may be made to the invention without departing from the spirit and the scope thereof. There is a given amount of error in any biometric system, but using the following principle, errors in false acceptances may be substantially reduced at the cost of extra inconvenience. If a fractional error rate of "Epsilon" is calculated for the process described here operating on one fingerprint derived composite number, then the error rate may be reduced to "epsilon squared" if verification for access requires that two fingers be presented, scanned and successfully compared. One finger could be good enough for commercial applications, while two or more might be desirable for highly sensitive secure areas. When a card applicant submits their fingerprint to a card issuance company for card or server database storage, the best method of extracting the composite number for this purpose is to scan a finger more than one time, and to extract a composite number from each scan of the finger. The composite numbers yielded from each scan are then averaged with each other on a parameter by parameter basis, and the averaged composite number is stored in the database. This increases the accuracy of the system relative to submitting a single scan for database storage. Hence, it is described to cover any and all modifications and forms which may come within the language and scope of the claims.

We claim:

1. An automated fingerprint identification system comprising:
    a) means for encoding a card with digitized indicia representing a fingerprint, obtained from the fingers of either hand, of a card applicant, wherein said digitized indicia comprises a personal identification number (PIN) or an account number which is further comprised of the following fingerprint identifying parameters:
        (1) block orientation which utilizes block sizes of 5×5 or 15×15 wherein if the majority of the 25 pixels or 225 pixels in a 5×5 or 15×15 block respectively have an orientation angle of $\phi$ degrees, then the respective block is assigned a block orientation of $\phi$ degrees,
        (2) row flow wherein the flow of a fingerprint is determined by the number of rows of said block wherein a row flow value is sequentially determined from the top to the bottom of the fingerprint block,
        (3) side detection wherein the width of the fingerprint is determined,
        (4) region flow wherein a single region of a fingerprint is analyzed,
        (5) ridge counting wherein an average pixel count of ridges changes from dark to bright values for each of a minimum number of "main orientations", and
        (6) average brightness wherein the average brightness is the sum of the brightness value of each pixel divided by the total number of pixels in the sample,
    b) means for reading said card and supplying said digitized indicia to a card database or a server database for storage and subsequent retrieval,
    c) means for scanning a fingerprint belonging to a presenter of said card and for producing a digitized indicia representing the fingerprint of the card presenter, and
    d) means for comparing the digitized indicia retrieved from said card database with the digitized indicia from the card presenter, wherein if said digitized indicia is similar, said card is validated and conversely, if the two digitized numbers are not similar, said card is invalidated.

2. The system as specified in claim 1 wherein said means for comparing the digitized indicia retrieved from said card database or said server database and from the card presenter comprises a comparison circuit which is operated by a comparison circuit software program and that includes circuit means for comparing the values of said fingerprint parameters, wherein said comparison circuit awards points to the person passing for himself or herself depending on how similar or dissimilar the fingerprint parameters are, wherein if the points totalled after comparing all the fingerprint parameters exceeds a pre-determined threshold, the person is allowed access, wherein said system further comprises two levels of security access namely a security level I and a remotely located security level II, wherein in security level I, after said card is swiped by a credit card swiping unit, the registered digitized fingerprint is retrieved from said card database wherein said composite number is produced and applied to said comparison circuit for further processing; and wherein in security level II, after said card is swiped by said credit card wiping unit, the registered digitized fingerprint is verified by the server database and thereafter retrieved from said server database wherein a composite number is produced that is applied to said comparison circuit for further processing.

3. An automated fingerprint identification system comprising:
    a) means for encoding a card with digitized indicia representing the fingerprint of a card applicant,
    b) means for reading said card and supplying said digitized indicia to a card database or server database for storage and subsequent retrieval,
    c) a finger print scanner for scanning a fingerprint belonging to a presenter of said card and for producing a digitized indicia representing the fingerprint of the card presenter,
    d) means for comparing the digitized indicia retrieved from said card database with the digitized indicia from the card presenter, wherein if said digitized indicia is similar, said card is validated and conversely if the two digitized numbers are not similar, said card is invalidated, and
    e) means for steadily holding a finger that is being scanned by said finger print scanner comprises a finger holder further comprising:
        (1) a first side member having an upper surface, a lower surface, a front edge and a rear edge, (2) a second side member having an upper surface, a lower surface, a front edge and a rear edge, (3) a rear finger support located at the rear edges and on the upper surfaces of said first and second side members, wherein said rear finger support having a downward extending angular surface with a substantially centered vertical apex, wherein said rear finger support maintains the finger in alignment relative to the x-axis of said fingerprint scanner, and (4) a front finger support located at the front edges and on the upper surfaces of said first and second side members, wherein said front finger support having a forward extending angular surface with a substantially centered horizontal apex that stops the tip of the finger at a consistent position relative to the y-axis of said scanner, wherein said front finger support is positioned slightly lower or higher than the rear finger support to allow a shadow to be cast from the ridges into the grooves of the finger while the light from said scanner shines on the finger, wherein the design of said finger holder prevents the finger from touching the surface of said fingerprint scanner.

4. An automated fingerprint identification system comprising:

a) means for encoding a card with digitized indicia representing the fingerprint, of a card applicant, b) means for reading said card and supplying said digitized indicia to a card database or a server database for storage and subsequent retrieval, c) a fingerprint scanner for scanning a fingerprint belonging to a presenter of said card and for producing a digitized indicia representing the fingerprint of the card presenter, d) means for comparing the digitized indicia retrieved from said card database with the digitized indicia from the card presenter, wherein if said digitized indicia is similar, said card is validated and conversly, if the two digitized numbers are not similar, said card is invalidated, e) means for steadily holding a finger that is being scanned by said finger print scanner comprises a finger holder further comprising:

(1) a first side member having an upper surface, a lower surface, a front edge and a rear edge, (2) a second side member having an upper surface, a lower surface, a front edge and a rear edge, (3) a rear finger support located at the rear edges and on the upper surfaces of said first and second side members, wherein said rear finger support having a downward extending angular surface with a substantially centered vertical apex, wherein said rear finger support maintains the finger in alignment relative to the x-axis of said fingerprint scanner, (4) a front finger support located at the front edges and on the upper surfaces of said first and second side members, wherein said front finger support having a forward extending angular surface with a substantially centered horizontal apex that stops the tip of the finger at a consistent position relative to the y-axis of said scanner, wherein said front finger support is positioned slightly lower or higher than the rear finger support to allow a shadow to be cast from the ridges into the grooves of the finger while the light from said scanner shines on the finger, and f) a green filter juxtapositioned adjacent the lower surface of said finger holder or adjacent the surface of said fingerprint scanner, wherein said green filter compensates for the various finger pigmentations.

5. A process for producing a card having imprinted thereon a composite number representative of a fingerprint of a specific individual, said process comprising the following steps:

a) submit a fingerprint belonging to a card applicant to a card issuance company wherein, said fingerprint is scanned by a fingerprint scanner, said scanned fingerprint image is digitized and a composite number is produced, which includes the following fingerprint identifying parameters:

(1) block orientation which utilizes block sizes of 5×5 or 15×15 wherein if the majority of the 25 pixels or 225 pixels in a 5×5 or 15×15 block respectfully have an orientation angle of $\phi$ degrees, then the respective block is assigned a block orientation of $\phi$ degrees, (2) row flow wherein the flow of a fingerprint is determined by the number of rows of said block wherein a row flow value is sequentially determined from the top to the bottom of the fingerprint block, (3) side detection wherein the width of the fingerprint is determined, (4) region flow wherein a single region of a fingerprint is analyzed, (5) ridge counting wherein an average pixel count of ridges changes from dark to bright values for each of a minimum number of "main orientations", and (6) average brightness wherein the average brightness is the sum of the brightness value of each pixel divided by the total number of pixels in the sample, (b) encode said composite number on said card and on a card database or a server database for subsequent retrieval for verification, (c) present said encoded card to a merchant for processing by a card reader and verification by said card database or said server database wherein, said composite number is verified, or not verified, if verified, said number is applied to a comparison circuit which is operated by a comparison circuit software program, d) submit a fingerprint of the card presenter to a merchant wherein, said fingerprint is scanned by a fingerprint scanner, said scanned fingerprint image is digitized and a composite number is produced, and e) apply said composite number derived from the merchants said fingerprint scanner to said comparison circuit, if said composite number from said scanner is similar to said composite number derived from said card database or server database, the card is validated conversely, if the two composite numbers are not identical, the card is invalidated.

6. The system as specified in claim 1 further comprising the following fingerprint identification parameters:

a) finger joint crease detection wherein the joint closest to the tip of the finger, on the fingerprint side, includes a crease which is measured, and b) feature extraction which is performed after said image has been processed in order to thin the thickness of the fingerprint ridges.

* * * * *